(12) United States Patent
Yamada et al.

(10) Patent No.: US 10,899,137 B2
(45) Date of Patent: Jan. 26, 2021

(54) ELECTRONIC APPARATUS

(71) Applicant: SEIKO EPSON CORPORATION, Tokyo (JP)

(72) Inventors: Tomonori Yamada, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/689,156

(22) Filed: Nov. 20, 2019

(65) Prior Publication Data

US 2020/0164656 A1 May 28, 2020

(30) Foreign Application Priority Data

Nov. 22, 2018 (JP) .................. 2018-219363

(51) Int. Cl.
*B41J 2/175* (2006.01)
*G06N 20/00* (2019.01)
*G06F 3/12* (2006.01)

(52) U.S. Cl.
CPC .......... *B41J 2/17566* (2013.01); *G06F 3/121* (2013.01); *G06F 3/1235* (2013.01); *G06N 20/00* (2019.01)

(58) Field of Classification Search
None
See application file for complete search history.

(56) References Cited

U.S. PATENT DOCUMENTS

| 8,437,647 | B2 | 5/2013 | Taniuchi | |
|---|---|---|---|---|
| 2006/0283933 | A1* | 12/2006 | Ueda | G03G 15/556 235/375 |
| 2011/0116815 | A1 | 5/2011 | Taniuchi | |
| 2015/0058034 | A1 | 2/2015 | Ayshford et al. | |
| 2017/0359439 | A1* | 12/2017 | Beach | G06Q 10/10 |
| 2020/0098456 | A1* | 3/2020 | Loscutoff | G16H 50/30 |

FOREIGN PATENT DOCUMENTS

| CN | 102055869 A | 5/2011 |
|---|---|---|
| JP | 2005-257601 A | 9/2005 |

* cited by examiner

*Primary Examiner* — Frantz Bataille
(74) *Attorney, Agent, or Firm* — Global IP Counselors, LLP

(57) ABSTRACT

An electronic apparatus includes consumables configured to be restored by replacement or refill, a notification section configured to make a notification of alert information based on remaining amount information of the consumables, a remaining amount information obtaining section configured to obtain the remaining amount information of the consumables, a determination information obtaining section configured to obtain determination information for determining a state of replacement or refill of the consumables, and a learning section configured to perform machine learning of the notification of the alert information based on a learning model obtained by associating the remaining amount information with the determination information.

10 Claims, 9 Drawing Sheets

|  |  | LARGE DOT | MIDDLE DOT | SMALL DOT | MICRO VIBRATION |
|---|---|---|---|---|---|
| [SIH, SIL] | | [1, 1] | [1, 0] | [0, 1] | [0, 0] |
| S | T1 | H | H | L | L |
|  | T2 | H | L | H | L |
|  | T3 | L | L | L | H |

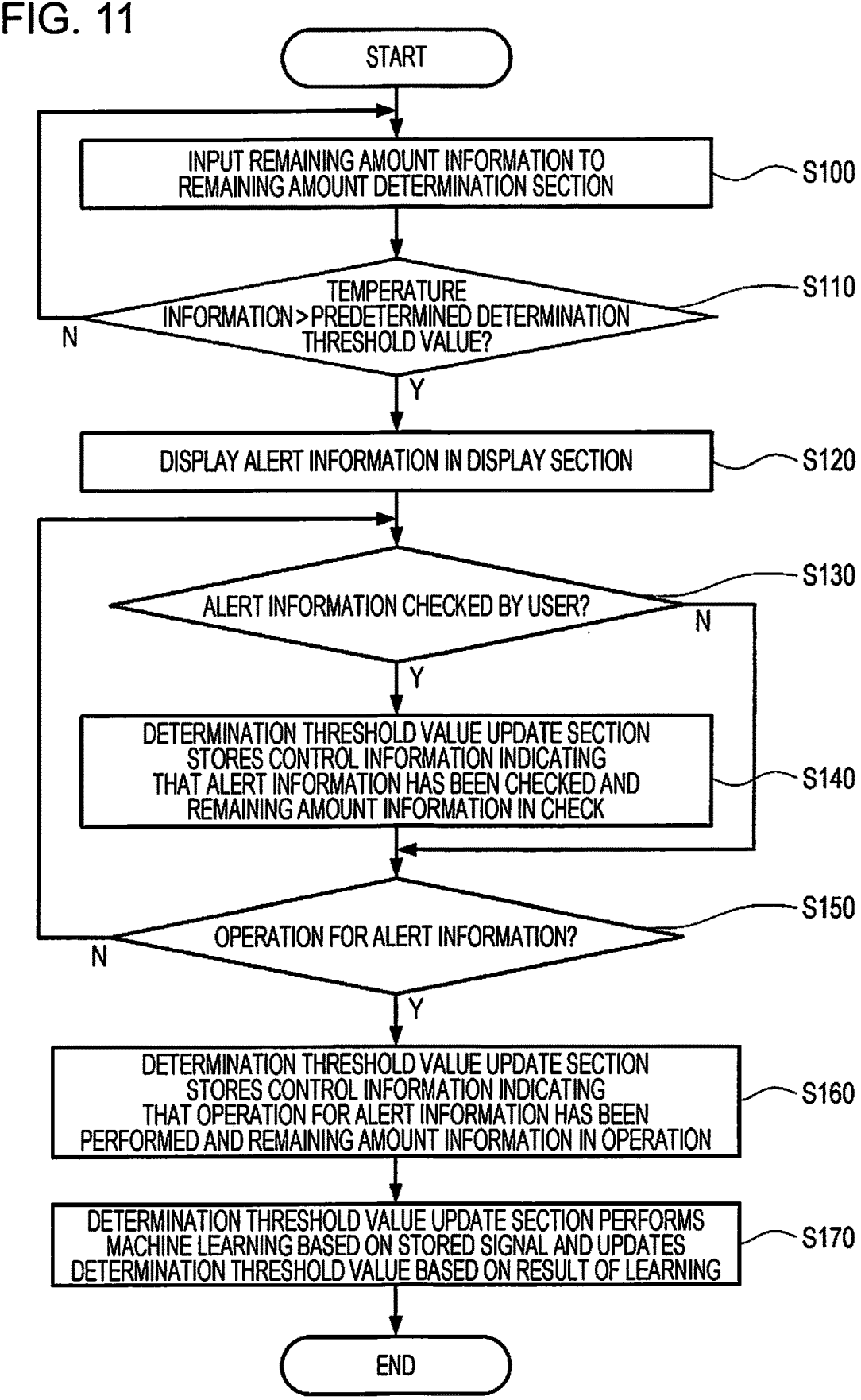

ELECTRONIC APPARATUS

The present application is based on, and claims priority from JP Application Serial Number 2018-219363, filed Nov. 22, 2018, the disclosure of which is hereby incorporated by reference herein in its entirety.

BACKGROUND

1. Technical Field

The present disclosure relates to an electronic apparatus.

2. Related Art

An electronic apparatus, such as an ink jet printer and a digital still camera, generally includes a display for notifying a user of various information of the electronic apparatus. The display included in such an electronic apparatus displays various information including apparatus unique information indicating a serial number of the electronic apparatus, operation information indicating an operation state in which the electronic apparatus normally operates, alert information indicating operation failure of the electronic apparatus or an insufficient amount of consumables, history information indicating information on past operations of the electronic apparatus and failure information, and setting information indicating various setting states of the electronic apparatus.

For example, JP A-2005-257601 discloses a digital still camera having an LCD panel as a display and a technique of using the LCD panel for image reproduction or as an electronic view finder and in addition using the LCD panel as a display which displays an alert message (alert information) for prompting replacement of a battery.

In the digital still camera disclosed in JP A-2005-257601, the alert information for prompting replacement of a battery is displayed based on a predetermined timing and a predetermined setting in response to an operation of turning on or off a power source. However, the timing of displaying the alert information desired by a user varies depending on a use environment or an operation situation of the electronic apparatus. Therefore, the alert information displayed based on the predetermined timing and the predetermined setting may not be displayed at a timing desired by the user.

SUMMARY

According to an aspect of the present disclosure, an electronic apparatus includes consumables configured to be restored by replacement or refill, a notification section configured to make a notification of alert information based on remaining amount information of the consumables, a remaining amount information obtaining section configured to obtain the remaining amount information of the consumables, a determination information obtaining section configured to obtain determination information for determining a state of replacement or refill of the consumables, and a learning section configured to perform machine learning of the notification of the alert information based on a learning model obtained by associating the remaining amount information with the determination information.

The learning section may perform the machine learning of a timing of the notification of the alert information when an operation for the notification is performed after the notification of the alert information is performed.

The learning section may perform the machine learning such that a timing of the notification of the alert information is delayed when an operation for the notification is not performed after the notification of the alert information is performed.

The learning section may determine whether the notification of the alert information is to be performed as the machine learning when an operation for the notification is not performed after the notification of the alert information is performed.

The learning section may perform the machine learning such that the notification of the alert information is performed earlier when an operation for the notification is performed after the notification of the alert information is performed.

The notification section may perform a re-notification of the alert information when an operation for the alert information is not performed after an operation for the notification is performed, and the learning section may not perform the machine learning such that the notification of the alert information is performed earlier even when an operation for the alert information is performed after an operation for the re-notification is performed.

The learning section may perform the machine learning of a determination threshold value of the remaining amount information used to determine whether the notification of the alert information is to be performed when an operation for the notification is performed after the notification of the alert information is performed.

The learning section may perform the machine learning such that the determination threshold value becomes small when an operation for the notification is not performed after the notification of the alert information is performed.

The learning section may perform the machine learning such that the determination threshold value becomes large when an operation for the notification is performed after the notification of the alert information is performed.

The notification section may perform a re-notification of the alert information when an operation for the alert information is not performed after an operation for the notification is performed, and the learning section may not perform the machine learning such that the determination threshold value becomes large even when an operation for the alert information is performed after an operation for the re-notification is performed.

BRIEF DESCRIPTION OF THE DRAWINGS

FIG. 11 is a flowchart of an operation of updating a determination threshold value stored in a remaining amount determination section.

DESCRIPTION OF EXEMPLARY EMBODIMENTS

Hereinafter, a preferred embodiment of the present disclosure will be described with reference to the accompanying drawings. The drawings are used for convenience sake. Note that the embodiment described below does not unduly limit content of the present disclosure disclosed in claims. Furthermore, it is not necessarily the case that all components described herein are requirements of the present disclosure. Hereinafter, an ink jet printer is taken as an example of the electronic apparatus according to the present disclosure.

1. Outline of Liquid Discharge Apparatus

Figure 1:
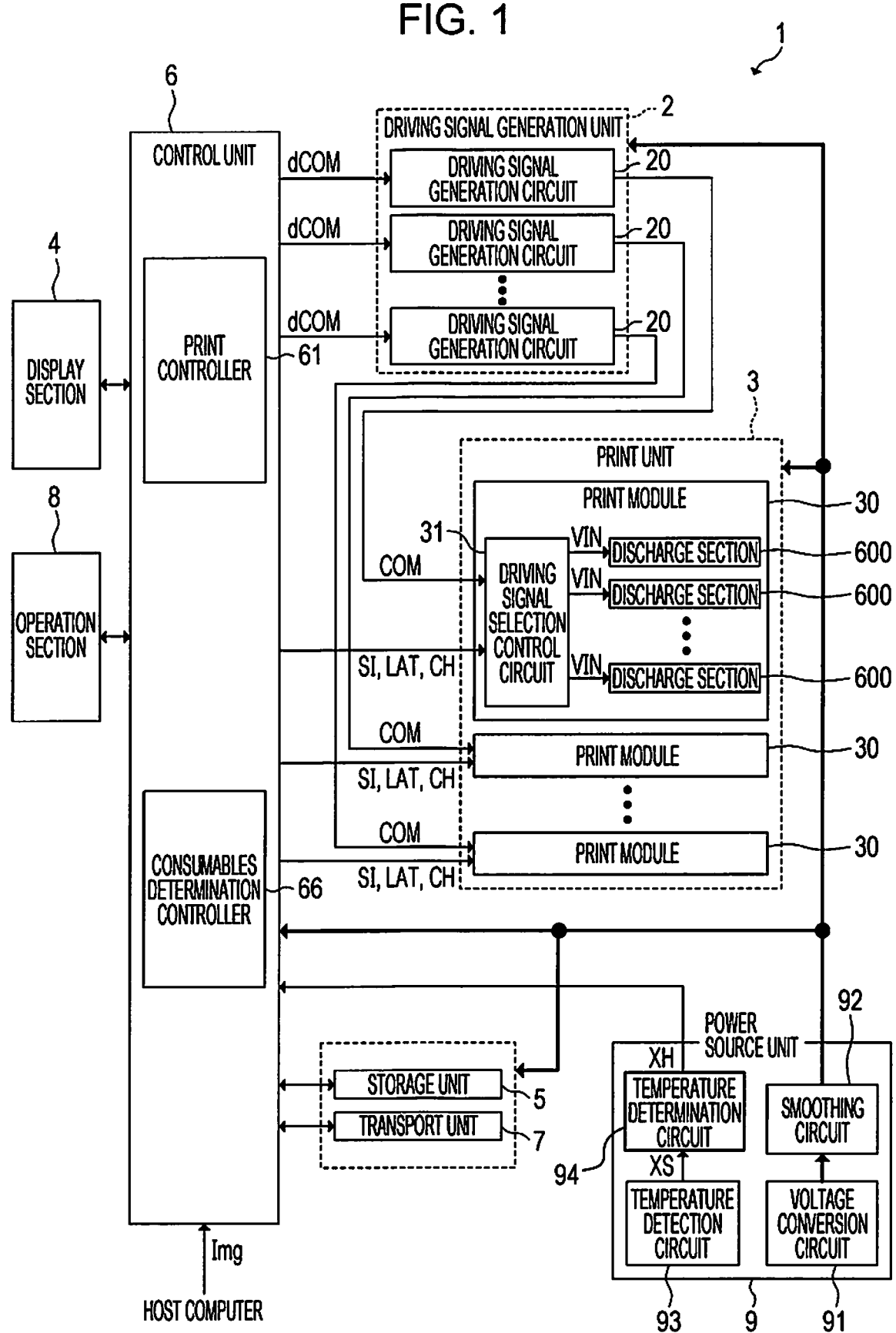
FIG. 1 is a functional block diagram illustrating an example of a configuration of an ink jet printer.
Figure 2:
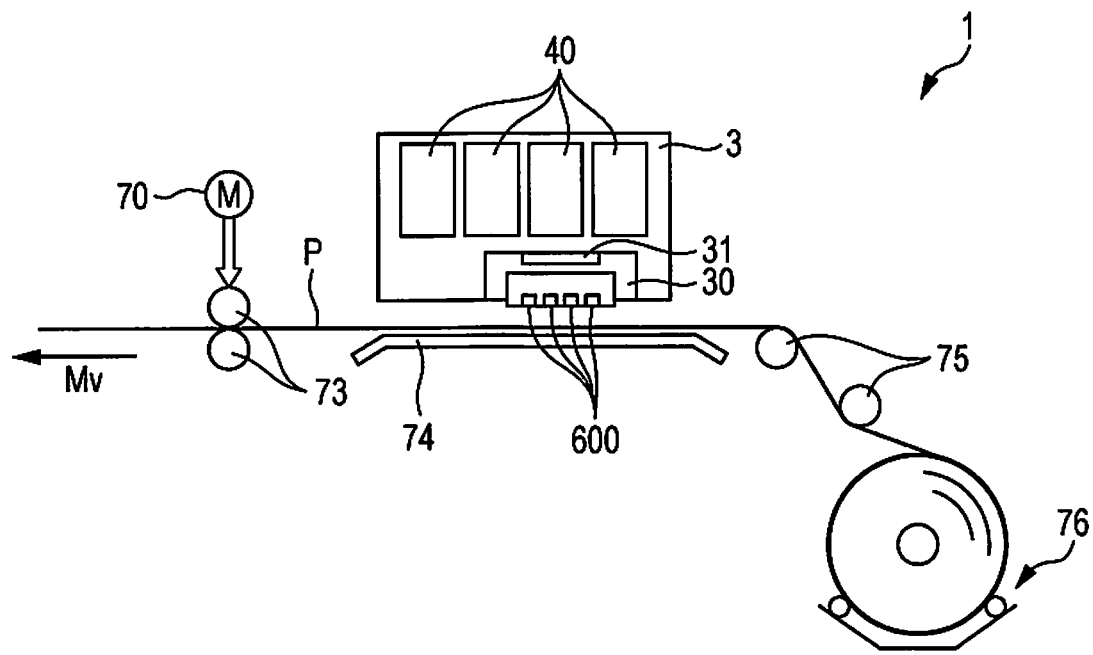
FIG. 2 is a cross sectional view schematically illustrating an example of an internal configuration of the ink jet printer.

A configuration of an ink jet printer 1 according to this embodiment will be described. FIG. 1 is a functional block diagram illustrating an example of a configuration of the ink jet printer 1 according to this embodiment. FIG. 2 is a cross sectional view schematically illustrating an example of an internal configuration of the ink jet printer 1. In this embodiment, a case where the ink jet printer 1 is a line printer will be described.

The ink jet printer 1 receives print data Img indicating an image to be formed by the ink jet printer 1 supplied from a host computer, such as a personal computer or a digital still camera, not illustrated. Then the ink jet printer 1 executes a print process of forming an image indicated by the print data Img on a recording sheet P.

As illustrated in FIG. 1, the ink jet printer 1 includes a driving signal generation unit 2, a print unit 3, a storage unit 5, a control unit 6, a transport unit 7, and a power source unit 9. Note that the driving signal generation unit 2, the print unit 3, the storage unit 5, the control unit 6, and the transport unit 7 are referred to as "operation units" hereinafter where appropriate.

The storage unit 5 includes at least one of a volatile memory, such as a random access memory (RAM), not illustrated, and a nonvolatile memory, such as a read only memory (ROM), an electrically erasable programmable read-only memory (EEPROM), or a programmable ROM (PROM), not illustrated. The storage unit 5 stores the print data Img, a control program of the ink jet printer 1, and various other information.

The control unit 6 includes a central processing unit (CPU), not illustrated. Furthermore, the control unit 6 may include, instead of the CPU or in addition to the CPU, a programmable logic device, such as a field-programmable gate array (FPGA), not illustrated. The CPU included in the control unit 6 executes the control program stored in the storage unit 5.

The control unit 6 further includes a print controller 61 and a consumables determination controller 66. The print controller 61 generates a print signal SI, a latch signal LAT, and a change signal CH which are used to control a driving signal selection control circuit 31 included in the print unit 3, a waveform specifying signal dCOM used to control a driving signal generation circuit 20 included in the driving signal generation unit 2, and a transport control signal used to control the transport unit 7.

The consumables determination controller 66 determines whether restoration of the consumables, such as ink, the recording sheet P, and the other consumables which are used in the ink jet printer 1, is to be performed by replacing or refilling the consumables based on states of the consumables.

The transport unit 7 changes a position of the recording sheet P relative to the print unit 3 based on the transport control signal supplied from the control unit 6.

The driving signal generation unit 2 includes a plurality of driving signal generation circuits 20. The control unit 6 supplies the waveform specifying signals dCOM to the respective driving signal generation circuits 20. Here, each of the waveform specifying signals dCOM is a digital signal which specifies a waveform of a driving signal COM. Each of the driving signal generation circuits 20 includes a D/A conversion circuit, not illustrated, which converts the supplied waveform specifying signal dCOM into an analog signal. Each of the driving signal generation circuits 20 amplifies the analog signal so as to generate a driving signal COM.

The print unit 3 includes a plurality of print modules 30. Each of the print modules 30 includes discharge sections 600 which discharge ink. Each of the print modules 30 includes M discharge sections 600 and the driving signal selection control circuit 31. The print signal SI, the latch signal LAT, the change signal CH, and the driving signal COM are supplied to the driving signal selection control circuit 31. The driving signal selection control circuit 31 selects or does not select the driving signal COM based on the print signal SI, the latch signal LAT, and the change signal CH so as to generate supply driving signals VIN corresponding to the M discharge sections 600. Then the driving signal selection control circuit 31 outputs the supply driving signals VIN to the corresponding discharge sections 600. Each of the M discharge sections 600 discharges a predetermined amount of ink which is specified by the print signal SI, the latch signal LAT, and the change signal CH at a predetermined timing when receiving the corresponding one of the supply driving signals VIN.

The power source unit 9 supplies electric power PW to the plurality of operation units included in the ink jet printer 1. The power source unit 9 includes a voltage conversion circuit 91, a smoothing circuit 92, a temperature detection circuit 93, and a temperature determination circuit 94 which are disposed on a substrate not illustrated. The voltage conversion circuit 91 converts an alternating-current voltage supplied from an alternating-current power source for commercial use and supplies the resultant alternating-current voltage to the smoothing circuit 92. The smoothing circuit 92 performs smoothing on the alternating-current voltage supplied from the voltage conversion circuit 91 so as to obtain a direct-current voltage. The temperature detection circuit 93 includes a detection element, such as a thermistor, which detects a temperature of the power source unit 9, detects a temperature of the power source unit 9 by the detection element, and outputs temperature information XS indicating a result of the detection of the temperature. The temperature information XS is supplied to the temperature determination circuit 94. The temperature determination circuit 94 outputs temperature determination information XH indicating a temperature state of the power source unit 9 based on the temperature information XS.

Here, the power source unit 9 supplies electric power PW to the plurality of operation units included in the ink jet printer 1. Therefore, in a case where a failure occurs in one of the operation units included in the ink jet printer 1, the electric power PW output from the power source unit 9 is increased. Then heat of the power source unit 9 is increased in accordance with increase in the electric power PW. Specifically, by detecting a change in temperature, an increased value of the temperature, and an increased time of the temperature of the power source unit 9, one of the operation units included in the ink jet printer 1 in which failure occurs may be determined in accordance with a result of the detections.

When the ink jet printer 1 configured as described above executes the print process, first, the print controller 61 causes the storage unit 5 to store the print data Img supplied from the host computer. Subsequently, the print controller 61 generates various signals including the print signal SI, the latch signal LAT, the change signal CH, the waveform specifying signal dCOM, and the transport control signal based on various data including the print data Img stored in the storage unit 5. Then the print controller 61 controls the print unit 3 so that the discharge sections 600 are driven while controlling the transport unit 7 such that a position of the recording sheet P relative to the print unit 3 is changed based on the print signal SI, the latch signal LAT, the change signal CH, the waveform specifying signal dCOM, the transport control signal, and the various data stored in the storage unit 5. In this way, the print controller 61 controls discharge of ink from the discharge sections 600, an amount of ink to be discharged, and a timing when the ink is discharged so as to form an image corresponding to the print data Img on the recording sheet P.

The ink jet printer 1 further includes a display section 4 and an operation section 8. The display section 4 is configured by a liquid crystal display, an organic electroluminescence display, or the like. The display section 4 displays various information including operation information indicating an operation state of the ink jet printer 1, failure information indicating that operation failure occurs, and remaining amount information indicating remaining amounts of consumables, such as ink and the recording sheet P under control of the print controller 61. The operation section 8 is a user interface (UI) to be used by the user to execute various operations including a start operation of starting the print process of the ink jet printer 1, a stop operation of stopping the print process, a recovery operation of recovering an operation failure or the like of the ink jet printer 1, and an operation of checking various information displayed in the display section 4. Here, the operation section 8 may be integrally formed with the display section 4 similarly to a touch panel.

FIG. 2 is a cross sectional view schematically illustrating an example of an internal configuration of the ink jet printer 1. Note that, although a case where the print unit 3 includes ink cartridges 40 is illustrated in FIG. 2, the ink cartridges 40 may be disposed in another portion of the ink jet printer 1. Furthermore, although a case where the ink jet printer 1 includes the four ink cartridges 40 is illustrated in FIG. 2, the ink jet printer 1 may include five or more ink cartridges 40 or three or less ink cartridges 40.

The ink cartridges 40 correspond to four colors of cyan, magenta, yellow, and black on a one-to-one basis. The individual ink cartridges 40 are filled with inks of the corresponding colors. Furthermore, each of the ink cartridges 40 has a sensor element which detects a remaining amount of filled ink. The sensor element may detect a remaining amount of ink based on a weight of the ink included in a corresponding one of the ink cartridges 40 or based on a waveform of a voltage or an electric current supplied to a corresponding one of the ink cartridges 40. The sensor element included in the ink cartridge 40 supplies a signal to the consumables determination controller 66.

The transport unit 7 includes a transport motor 70 serving as a driving source for transporting the recording sheet P, a platen 74 disposed in a discharge direction of ink discharged by the print unit 3 through the recording sheet P, transfer rollers 73 which are rotated by the transport motor 70, guide rollers 75 disposed in a rotatable manner, and an accommodation section 76 used to accommodate the recording sheet P in a rolled manner. Furthermore, the accommodation section 76 includes a sensor element which detects a remaining number of recording sheets P. The sensor element may detect a remaining number of recording sheets P based on a weight of the recording sheets P accommodated in the accommodation section 76 or may detect a remaining number of recording sheets P based on a diameter of a roll of the recording sheet P which is rolled.

When the ink jet printer 1 executes the print process, the transport unit 7 takes out the recording sheet P from the accommodation section 76 and transports the recording sheet P in a transport direction My defined by the guide rollers 75, the platen 74, and the transfer rollers 73. Note that, although a case where the recording sheet P is a long rolled sheet is illustrated in FIG. 2, the recording sheet P may be a rectangle sheet of an A4 size, for example. In this case, the transport unit 7 intermittently supplies the recording sheet P in the transport direction My on the platen 74 one by one.

The ink cartridges 40 supply ink to the discharge sections 600 included in the print unit 3. The discharge sections 600 are filled with the ink supplied from the ink cartridges 40 and discharge the filled ink. Then the discharge sections 600 discharge the ink to the recording sheet P when the transport unit 7 transports the recording sheet P onto the platen 74. In this way, dots constituting an image are formed on the recording sheet P.

2. Configuration and Operation of Print Module

Figure 3:
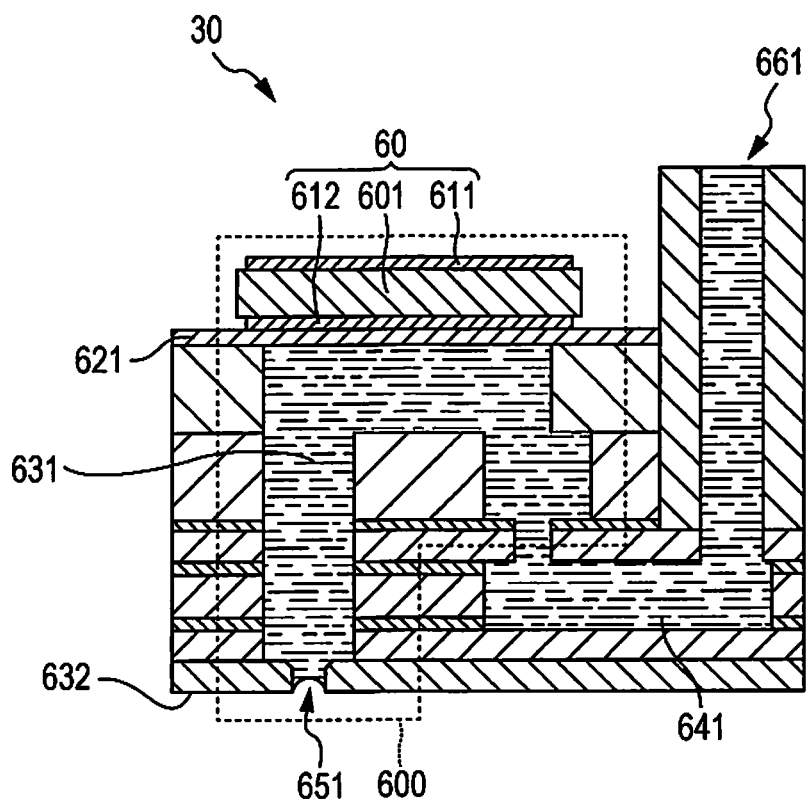
FIG. 3 is a cross sectional view schematically illustrating a configuration of a discharge portion.

Here, a configuration and an operation of the discharge sections 600 included in the print modules 30 will be described. FIG. 3 is a cross sectional view schematically illustrating a configuration of one of the discharge sections 600. As illustrated in FIG. 3, each of the print modules 30 includes the discharge sections 600 and reservoirs 641.

Each of the reservoirs 641 has an ink supply port 661 to which ink is supplied. Furthermore, the reservoirs 641 are disposed for the individual colors of ink.

Each of the discharge sections 600 includes a piezoelectric element 60, a vibration plate 621, a cavity 631, and a nozzle 651. The vibration plate 621 is disposed between the cavity 631 and the piezoelectric element 60, displaced in accordance with driving of the piezoelectric element 60 disposed on an upper surface thereof, and functions as a diaphragm which increases or reduces an internal volume of the cavity 631 which is filled with ink. The nozzle 651 is an opening portion which is disposed on a nozzle plate 632 and communicates with the cavity 631. The cavity 631 is filled with ink and functions as a pressure chamber having an internal volume which is changed due to the displacement of the piezoelectric element 60. The nozzle 651 communicates with the cavity 631 and discharges the ink included in the cavity 631 in accordance with a change of the internal volume of the cavity 631.

The piezoelectric element 60 is configured such that a piezoelectric body 601 is sandwiched between a pair of electrodes 611 and 612. A supply driving signal VIN is supplied to the electrode 611. A signal of a constant voltage is supplied to the electrode 612. Here, the signal of a constant voltage supplied to the electrode 612 may be a signal of a ground potential or a signal of a constant potential, such as DC 5V. Note that, in a description below, the signal supplied to the electrode 612 of the piezoelectric element 60 is referred to as a reference voltage signal VBS where appropriate. The piezoelectric element 60 having the configuration described above is driven in accordance with a potential difference between the electrodes 611 and 612. In this way, center portions of the electrodes 611 and 612 and the vibration plate 621 are displaced in a vertical direction relative to both end portions. The nozzle 651 discharges the ink in accordance with the displacement of the vibration plate 621. Specifically, in the discharge section 600, the piezoelectric element 60 is driven by a potential difference between the electrodes 611 and 612 and the ink is discharged from the nozzle 651 due to the driving of the piezoelectric element 60.

Figure 4:
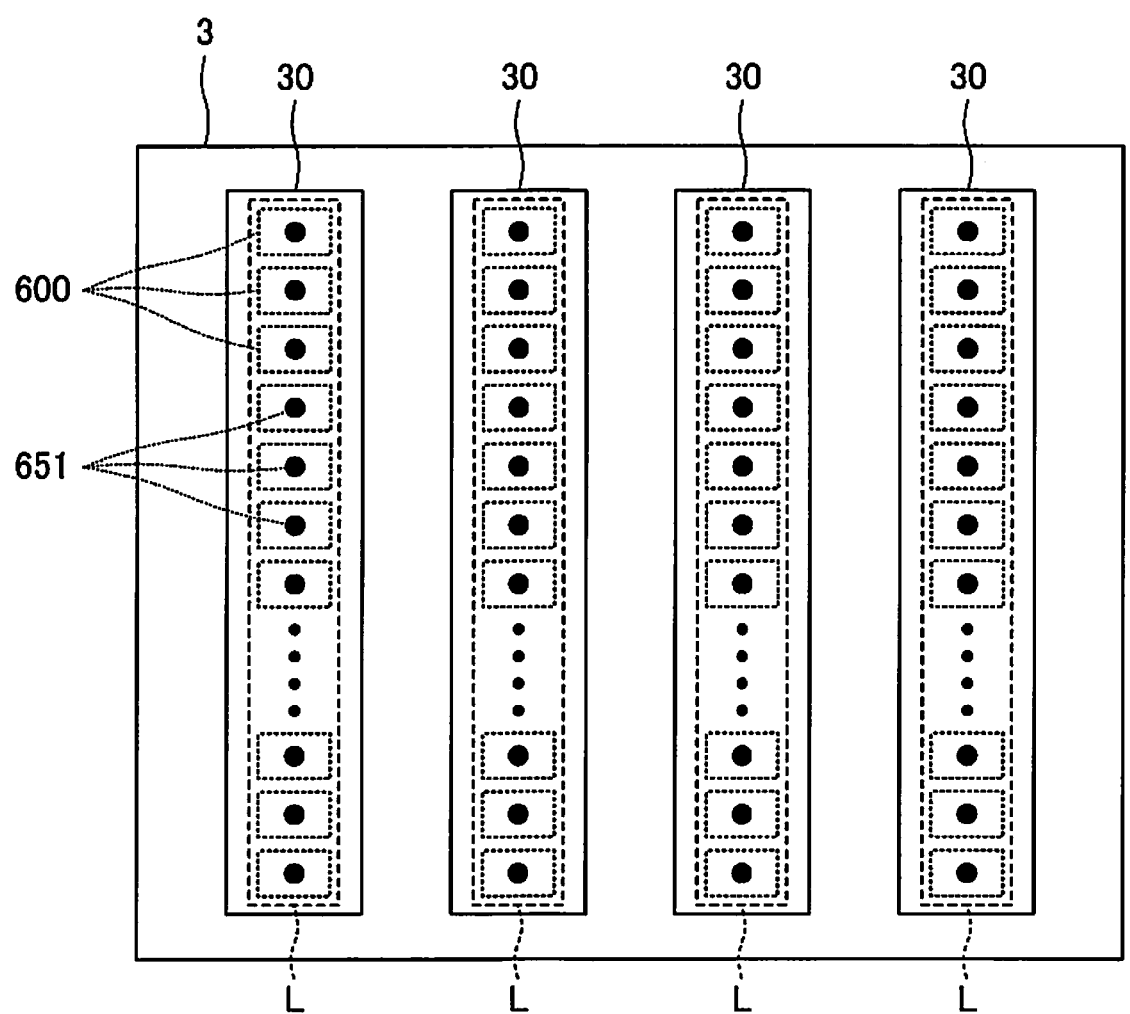
FIG. 4 is a diagram illustrating an example of arrangement of a plurality of nozzles.

FIG. 4 is a diagram illustrating an example of arrangement of a plurality of nozzles 651 included in the print modules 30. Note that a case where the print unit 3 includes the four print modules 30 is illustrated in FIG. 4.

As illustrated in FIG. 4, each of the print modules 30 has a nozzle line L including a plurality of nozzles 651 arranged in a predetermined direction. Each of the nozzle lines L is formed by n nozzles 651 arranged in a line. Here, the nozzle lines L of FIG. 4 are only an example and may have a different configuration. For example, in each of the nozzle lines L, the n nozzles 651 may be arranged in a zigzag manner such that even-numbered nozzles 651 and odd-numbered nozzles 651 counted from an end are alternately arranged. Furthermore, each of the print modules 30 may have two or more nozzle lines L.

Next, a configuration and an operation of the driving signal selection control circuit 31 included in each of the print modules 30 will be described. Before the description of the driving signal selection control circuit 31, first, an example of the driving signal COM supplied to the driving signal selection control circuit 31 will be described with reference to FIG. 5. Thereafter, the configuration and the operation of the driving signal selection control circuit 31 will be described with reference to FIGS. 6 to 9.

Figure 5:
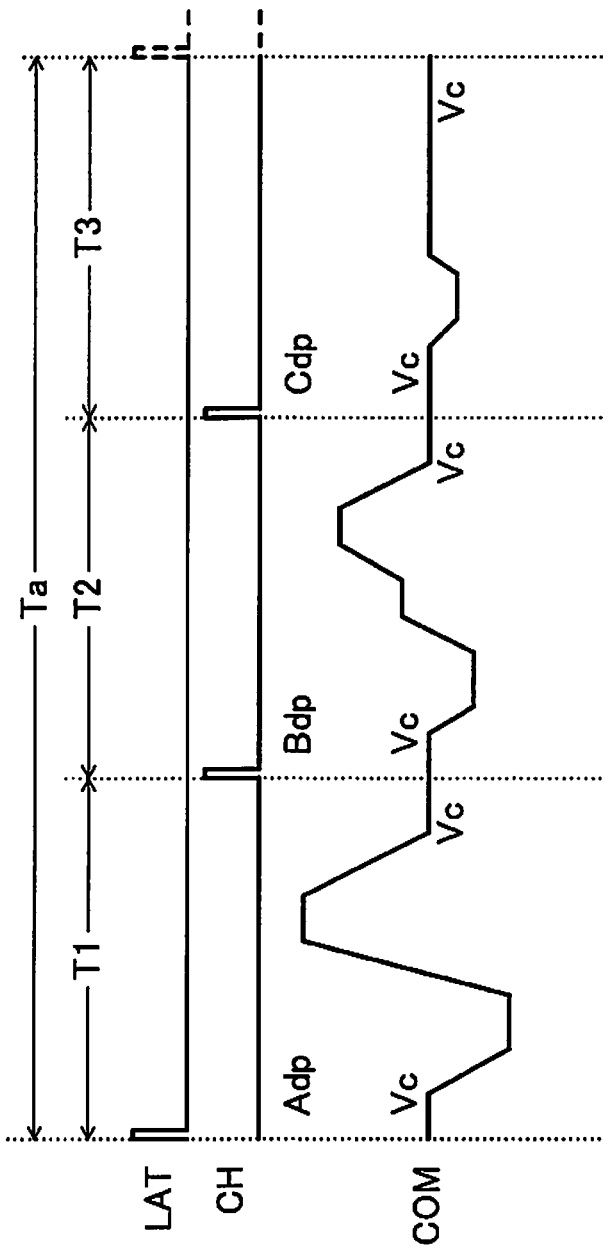
FIG. 5 is a diagram illustrating an example of a driving signal COM.

FIG. 5 is a diagram illustrating an example of the driving signal COM. In FIG. 5, a period of time T1 from when the latch signal LAT rises to when the change signal CH rises, a period of time T2 from when the period of time T1 is terminated to when the change signal CH rises again, and a period of time T3 from when the period of time T2 is terminated to when the latch signal LAT rises are illustrated. Note that a cycle Ta including the periods of time T1, T2, and T3 is used to form a new dot on the recording sheet P.

As illustrated in FIG. 5, each of the driving signal generation circuits 20 generates a voltage waveform Adp in the period of time T1. When the voltage waveform Adp is supplied to the piezoelectric element 60, a corresponding one of the discharge sections 600 discharges a predetermined amount of ink, that is, a middle amount of ink. Furthermore, the driving signal generation circuit 20 generates a voltage waveform Bdp in the period of time T2. When the voltage waveform Bdp is supplied to the piezoelectric element 60, a corresponding one of the discharge sections 600 discharges a small amount of ink which is less than the predetermined amount of ink. Furthermore, the driving signal generation circuit 20 generates a voltage waveform Cdp in the period of time T3. When the voltage waveform Cdp is supplied to the piezoelectric element 60, the piezoelectric element 60 is displaced in a degree that a corresponding one of the discharge sections 600 does not discharge ink. Therefore, when the voltage waveform Cdp is supplied to the piezoelectric element 60, dots are not formed on the recording sheet P. The voltage waveform Cdp suppresses increase in viscosity of ink by finely vibrating ink in the vicinity of a nozzle opening portion of a corresponding one of the discharge sections 600. In a description below, displacement of the piezoelectric element 60 in a degree that a corresponding one of the discharge sections 600 does not discharge ink so that increase in viscosity of ink is suppressed may be referred to as "micro vibration" where appropriate.

Here, voltage values obtained when the voltage waveforms Adp, Bdp, and Cdp are started and terminated are all a voltage Vc in common. Specifically, the voltage waveform Adp, Bdp, and Cdp are started in a voltage value of the voltage Vc and terminated in a voltage value of the voltage Vc. Accordingly, the driving signal generation circuit 20 outputs a driving signal COM having a voltage waveform in which the voltage waveforms Adp, Bdp and Cdp consecutively appear in the cycle Ta.

Figure 6:
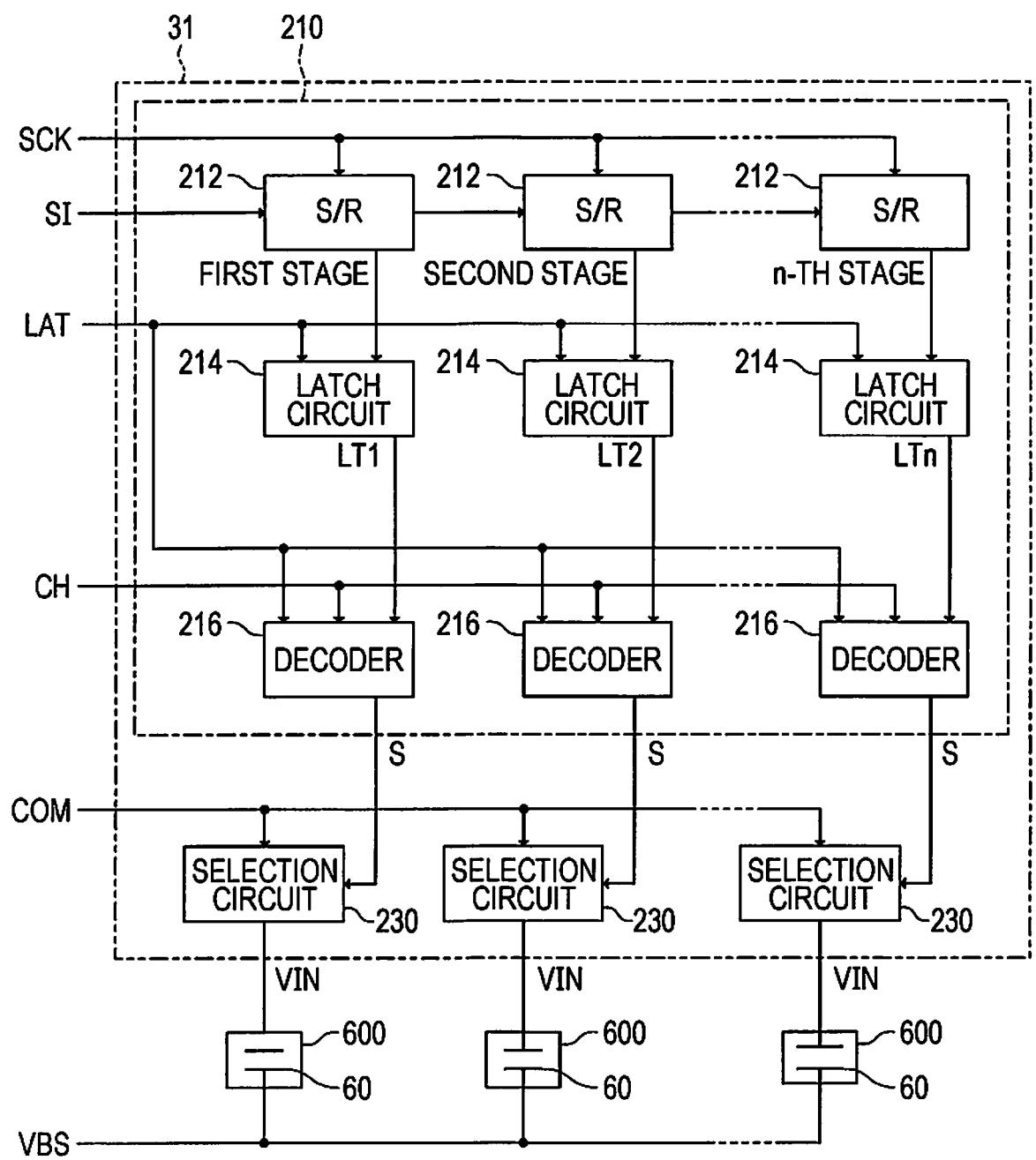
FIG. 6 is a block diagram illustrating an electric configuration of a driving signal selection control circuit.

FIG. 6 is a block diagram illustrating an electric configuration of the driving signal selection control circuit 31. The driving signal selection control circuit 31 generates and outputs a supply driving signal VIN in the cycle Ta by determining whether the voltage waveforms Adp, Bdp, and Cdp included in the driving signal COM are selected in the individual periods of times T1, T2, and T3. As illustrated in FIG. 6, the driving signal selection control circuit 31 includes a selection control circuit 210 and a plurality of selection circuits 230.

The selection control circuit 210 receives a clock signal SCK, the print signal SI, the latch signal LAT, and the change signal CH. Groups of a shift register (S/R) 212, a latch circuit 214, and a decoder 216 are included in the selection control circuit 210 so as to correspond to the respective discharge sections 600. That is, each of the print modules 30 includes a number of groups of the shift register 212, the latch circuit 214, and the decoder 216 corresponding to an n total number of discharge sections 600.

The shift register 212 temporarily stores print data [SIR, SIL] of 2 bits included in the print signal SI for a corresponding one of the discharge sections 600. Specifically, the shift registers 212 of stages corresponding to the discharge sections 600 are connected to each other in series and the print signal SI serially supplied is successively transferred to the later stages in accordance with the clock signal SCK. Note that stage 1 to stage n are assigned to the shift registers 212 in turn from an upstream side of supply of the print signal SI so that the shift registers 212 are distinguished from one another in FIG. 6.

Each of the n latch circuits 214 latches the print data [SIH, SIL] stored in a corresponding one of the shift registers 212 when the latch signal LAT rises. Each of the n decoders 216 decodes the print data [SIH, SIL] of two bits which is latched by a corresponding one of the latch circuits 214 so as to generate a selection signal S to be supplied to a corresponding one of the selection circuits 230.

The selection circuits 230 are disposed for the respective discharge sections 600. Specifically, the number of selection circuits 230 included in one of the print modules 30 is the same as the total number n of the discharge sections 600 included in the print module 30. Each of the selection circuits 230 controls supply of the driving signal COM to the piezoelectric element 60 based on the selection signal S supplied from the decoder 216.

Figures 7, 8:
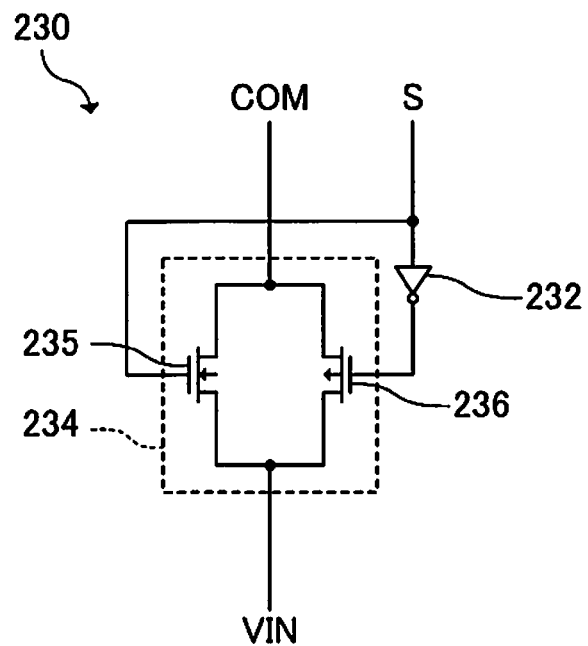
FIG. 7 is a circuit diagram illustrating an electric configuration of a selection circuit.
FIG. 8 is a diagram illustrating content of decoding performed by a decoder.

FIG. 7 is a circuit diagram illustrating an electric configuration of the selection circuit 230 for one of the discharge sections 600. As illustrated in FIG. 7, the selection circuit 230 includes an inverter 232 and a transfer gate 234. Furthermore, the transfer gate 234 includes an NMOS transistor 235 and a PMOS transistor 236.

The selection signal S is supplied from the decoder 216 to a gate terminal of the transistor 235. Furthermore, the selection signal S is subjected to logical inversion by the inverter 232 and is also supplied to a gate terminal of the transistor 236. The driving signal COM is supplied to a drain terminal of the transistor 235 and a source terminal of the transistor 236. Then the transistor 235 and the transistor 236 are turned on or off in accordance with the selection signal S so that the supply driving signal VIN is output from a connection point in which a source terminal of the transistor 235 and a drain terminal of the transistor 236 are connected to each other in common.

Next, content of decoding performed by the decoder 216 will be described with reference to FIG. 8. FIG. 8 is a diagram illustrating content of decoding performed by the decoder 216. The decoder 216 receives the print data [SIH, SIL] of two bits, the latch signal LAT, and the change signal CH. Then the decoder 216 outputs the selection signal S of a logic level specified by the print data [SIH, SIL] in the individual periods of time T1, T2, and T3 defined by the latch signal LAT and the change signal CH. For example, when [1, 0] is input to the decoder 216 as the print data [SIH, SIL], the decoder 216 outputs a selection signal S which becomes a high level, a low level, and a low level in the periods of time T1, T2, and T3, respectively. Here, the logical level of the selection signal S is shifted to a logical level of a signal of a high voltage as high amplitude logic by a level shifter not illustrated.

An operation of generating the supply driving signal VIN based on the driving signal COM and supplying the supply driving signal VIN to the discharge sections 600 included in a corresponding one of the print modules 30 which is performed by the driving signal selection control circuit 31 described above will be described with reference to FIG. 9.

Figure 9:
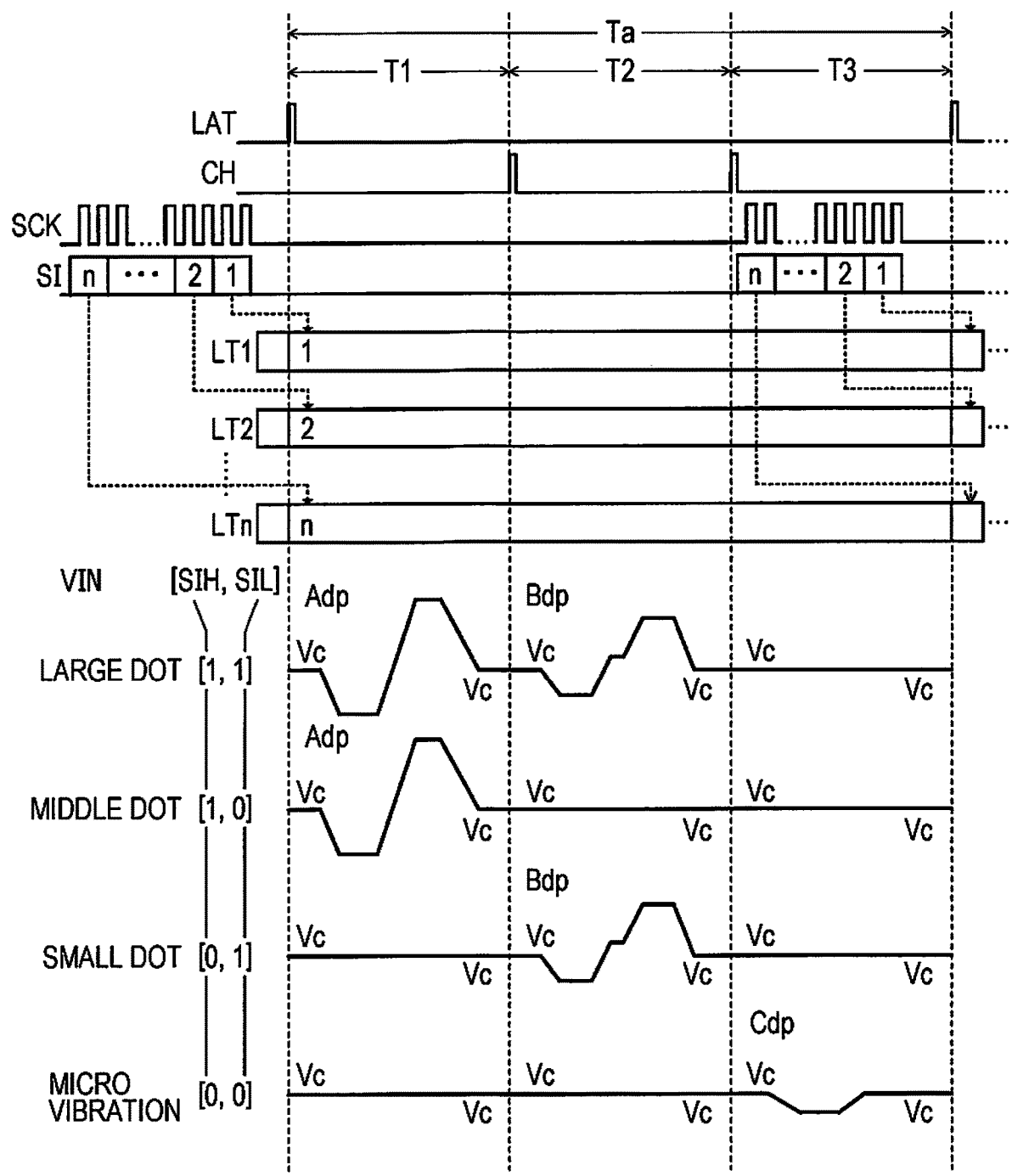
FIG. 9 is a diagram illustrating an operation of the driving signal selection control circuit.

FIG. 9 is a diagram illustrating an operation of the driving signal selection control circuit 31. As illustrated in FIG. 9, the print signal SI is serially supplied to the driving signal selection control circuit 31 in synchronization with the clock signal SCK and the shift registers 212 corresponding to the discharge sections 600 successively transfer the print signal SI. When supply of the clock signal SCK is stopped, each of the shift registers 212 stores the print data [SIH, SIL] corresponding to the discharge sections 600. Note that the print signal SI is supplied in order of the discharge sections 600 in the last n stage to the first stage of the shift registers 212.

When the latch signal LAT rises, each of the latch circuits 214 simultaneously latches the print data [SIH, SIL] stored in the corresponding shift registers 212. In FIG. 9, LT1 to LTn indicate the print data [SIH, SIL] latched by the latch circuits 214 corresponding to the shift registers 212 in the first to n-th stages.

The decoders 216 output selection signals S of logical levels in accordance with content of FIG. 8 in the individual periods of time T1 to T3 in accordance with a size of a dot defined by the latched print data [SIH, SIL].

When the print data [SIH, SIL] is [1, 1], the selection circuit 230 selects the voltage waveform Adp in the period of time T1, selects the voltage waveform Bdp in the period of time T2, and does not select the voltage waveform Cdp in the period of time T3 in accordance with the selection signal S. Consequently, the supply driving signal VIN corresponding to a large dot is generated as illustrated in FIG. 9. Accordingly, a middle amount of ink and a small amount of ink are discharged from the discharge section 600 in the cycle Ta. By this, a "large dot" is formed on the recording sheet P.

Furthermore, when the print data [SIH, SIL] is [1, 0], the selection circuits 230 selects the voltage waveform Adp in the period of time T1, does not select the voltage waveform Bdp in the period of time T2, and does not select the voltage waveform Cdp in the period of time T3 in accordance with the selection signal S. Consequently, the supply driving signal VIN corresponding to a middle dot is generated as illustrated in FIG. 9. Accordingly, a middle amount of ink is discharged from the discharge section 600 in the cycle Ta. By this, a "middle dot" is formed on the recording sheet P.

Moreover, when the print data [SIH, SIL] is [0, 1], the selection circuits 230 does not select the voltage waveform Adp in the period of time T1, selects the voltage waveform Bdp in the period of time T2, and does not select the voltage waveform Cdp in the period of time T3 in accordance with the selection signal S. Consequently, the supply driving signal VIN corresponding to a small dot is generated as illustrated in FIG. 9. Accordingly, a small amount of ink is discharged from the discharge section 600 in the cycle Ta. By this, a "small dot" is formed on the recording sheet P.

Furthermore, when the print data [SIH, SIL] is [0, 0], the selection circuits 230 does not select the voltage waveform Adp in the period of time T1, does not select the voltage waveform Bdp in the period of time T2, and selects the voltage waveform Cdp in the period of time T3 in accordance with the selection signal S. Consequently, the supply driving signal VIN corresponding to micro vibration is generated as illustrated in FIG. 9. Accordingly, ink is not discharged from the discharge section 600 in the cycle Ta and the micro vibration occurs. In this case, dots are not formed on the recording sheet P.

3. Configuration and Operation of Consumables Determination Controller

The ink jet printer 1 configured as described above uses consumables, such as ink which fills the ink cartridges 40 and recording sheets P, which may be restored by replacement or refill. Remaining amounts of the consumables are detected by sensor elements or the like and are supplied to the consumables determination controller 66 of the control unit 6. Thereafter, the consumables determination controller 66 determines whether print quality desired by the user is satisfied using the remaining amounts of the consumables and supplies a signal indicating a result of the determination to the print controller 61. The print controller 61 displays alert information based on the result of the determination in the display section 4 and prompts the user to replace or refill the consumables by making a notification indicating the remaining amounts of the consumables for the user.

However, an appropriate timing of replacement or refill of the consumables varies depending on users. For example, a notification indicating a so-called "near-end state" indicating that a remaining amount of ink is small is made when an amount of ink included in one of the ink cartridges 40 used in the ink jet printer 1 is approximately 3% to 5% relative to an amount of ink which fills the ink cartridge 40. However, in a use environment in which continuous printing is performed on a medium, such as a rolled sheet, the entire rolled sheet may be discarded if print quality is deteriorated due to an insufficient amount of ink during the continuous printing. Therefore, in the use environment in which the continuous printing is performed, the user may replace the ink cartridges 40 before the notification of the near-end state.

Furthermore, even in a so-called end state in which sufficient print quality may not be maintained since a remaining amount of ink in the ink jet printer 1 is small, if print quality desired by the user may be ensured by the remaining amount of ink, the user may continuously execute the print process without replacement of the ink cartridges 40.

As described above, a timing when a notification of alert information indicating that remaining amounts of consumables are in the near-end state or an end state is made varies depending on users or use environments. Therefore, in the present disclosure, the notification of the alert information may be made at a timing appropriate for the user by the consumables determination controller 66 included in the ink jet printer 1.

Figure 10:
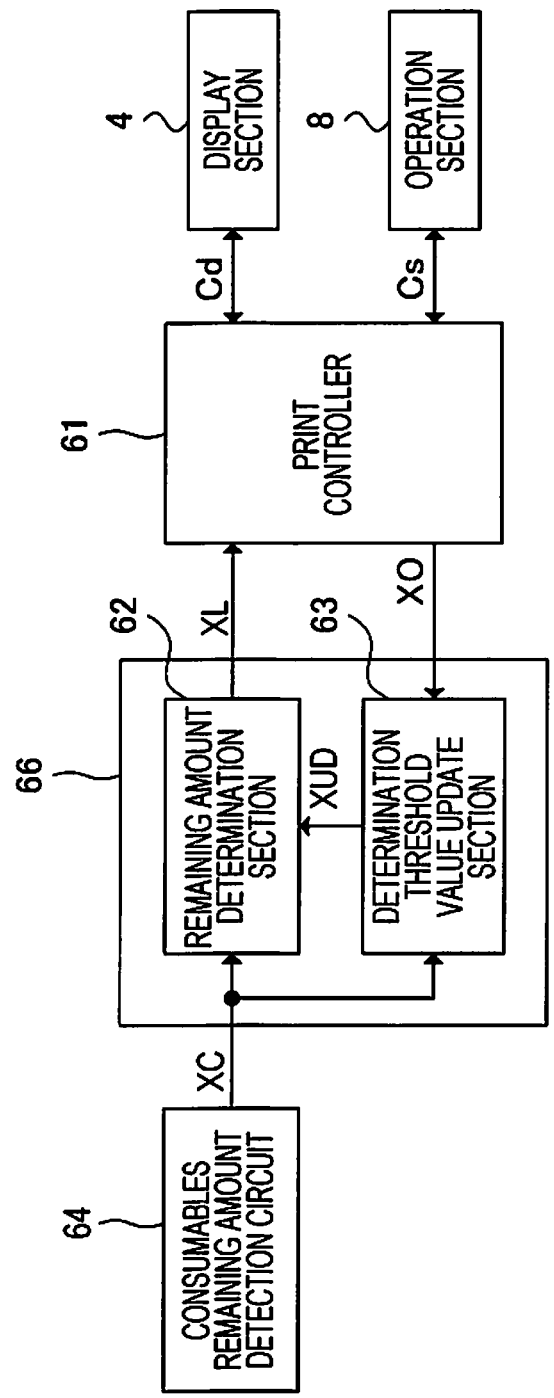
FIG. 10 is a block diagram illustrating a configuration of a consumables determination controller and configurations of peripherals of the consumables determination controller.

A configuration and an operation of the consumables determination controller 66 of this embodiment will be described with reference to FIGS. 10 and 11. As illustrated in FIG. 10, the ink jet printer 1 of this embodiment includes the display section 4 which displays alert information based on remaining amount information XC of the consumables which may be restored by replacement or refill, a consumables remaining amount detection circuit 64 which obtains the remaining amount information XC of the consumables, a remaining amount determination section 62 which obtains determination information for determining states of replacement or refill of the consumables, and a determination threshold value update section 63 which mechanically learns display of the alert information based on a learning model in which the remaining amount information XC and the determination information are associated with each other.

FIG. 10 is a block diagram illustrating a configuration of the consumables determination controller 66 and configurations of peripherals of the consumables determination controller 66. As illustrated in FIG. 10, the consumables determination controller 66 includes the remaining amount determination section 62 and the determination threshold value update section 63.

The remaining amount determination section 62 receives the remaining amount information XC indicating remaining amounts of consumables detected by the consumables remaining amount detection circuit 64. The remaining amount determination section 62 determines whether remaining amounts of consumables are sufficient, in the near-end state, or in the end state based on a result of a determination as to whether the supplied remaining amount information XC exceeds a predetermined determination threshold value. Specifically, the remaining amount determination section 62 determines remaining amounts of consumables based on a result of a determination as to whether remaining amounts of consumables supplied as the remaining amount information XC are smaller than the predetermined determination threshold value. That is, the remaining amount determination section 62 is an example of a determination information obtaining section which obtains determination information for determining states of replacement or refill of the consumables. Thereafter, the remaining amount determination section 62 generates remaining amount determination information XL indicating the determination information and outputs the remaining amount determination information XL to the print controller 61. Here, the remaining amount information XC supplied to the remaining amount determination section 62 may be an analog signal detected by the sensor element or the like included in the consumables remaining amount detection circuit 64 or a digital signal obtained through conversion performed by the consumables remaining amount detection circuit 64. Note that, although the single consumables remaining amount detection circuit 64 is illustrated in FIG. 10, a plurality of consumables remaining amount detection circuits 64 may be disposed for a number of consumables used in the ink jet printer 1 or a number of types of consumables. For example, the consumables remaining amount detection circuit 64 of this embodiment includes a plurality of sensor elements, such as sensor elements which detect remaining amounts of ink of the ink cartridges 40 and a sensor element which detects a remaining number of recording sheets P which are not illustrated. As described above, the consumables remaining amount detection circuit 64 having the sensor elements which obtain remaining amount information of the consumables is an example of a remaining amount information obtaining section.

The print controller 61 generates alert information indicating the near-end state or the end state of the remaining amounts of consumables of the ink jet printer 1 based on the input remaining amount determination information XL and outputs display information Cd to be displayed in the display section 4. The display section 4 displays the alert information in accordance with the input display information Cd. Specifically, the display section 4 which informs the user of the alert information by displaying the alert information based on the remaining amount information XC of the consumables is an example of a notification section.

Furthermore, the print controller 61 outputs operation information Cs including a signal used to enable an operation for the alert information displayed in the display section 4 to the operation section 8. Moreover, when an operation for the alert information displayed in the display section 4 is performed using the operation section 8, the print controller 61 may display information corresponding to the operation in the display section 4. When an operation for the display in the display section 4 is performed by the operation section 8, the print controller 61 outputs a signal indicating that the operation for the display in the display section 4 has been performed to the determination threshold value update section 63 as control information XO. Furthermore the print controller 61 outputs a signal indicating completion of the process to the determination threshold value update section 63 as the control information XO when a process of restoration by replacement or refill is executed on the remaining amounts of consumables.

The determination threshold value update section 63 receives the control information XO and the remaining amount information XC. The determination threshold value update section 63 mechanically learns the display of the alert information based on the learning model in which the remaining amount information XC and the determination information are associated with each other using the remaining amount information XC and the control information XO. Thereafter, the determination threshold value update section 63 outputs an update signal XUD used to update the determination threshold value stored in the remaining amount determination section 62 based on a result of the machine learning. Here, the determination threshold value update section 63 is an example of a learning section.

Here, an operation of updating the determination threshold value of the remaining amount determination section 62 will be described with reference to FIG. 11. FIG. 11 is a flowchart of the operation of updating the determination threshold value of the remaining amount determination section 62.

First, the consumables remaining amount detection circuit 64 obtains remaining amounts of consumables. The remaining amounts of consumables obtained by the consumables remaining amount detection circuit 64 are supplied to the remaining amount determination section 62 as the remaining amount information XC (step S100). Thereafter, the remaining amount determination section 62 determines whether the remaining amount information XC is smaller than a predetermined determination threshold value (step S110). By this, the remaining amount determination section 62 determines whether the remaining amounts of consumables of the ink jet printer 1 are sufficient, in a near-end state, or in an end state.

When the remaining amount determination section 62 determines that the remaining amount information XC is larger than the predetermined determination threshold value (N in step S110), the consumables remaining amount detection circuit 64 obtains the remaining amounts of consumables and the remaining amounts of consumables are supplied to the remaining amount determination section 62 as the remaining amount information XC (step S100).

When the remaining amount determination section 62 determines that the remaining amount information XC is smaller than the determination threshold value (Y in step S110), the display section 4 displays alert information indicating that the remaining amounts of consumables are in the near-end state or the end state (step S120). Specifically, the remaining amount determination section 62 determines whether determination information obtained based on the remaining amount information XC is smaller than the predetermined determination threshold value indicating the near-end state or smaller than the predetermined determination threshold value indicating the end state, obtains determination information indicating a consumables replacement state or a consumables refill state based on a result of the determination, and outputs remaining amount determination information XL indicating the determination information. The remaining amount determination information XL is supplied to the print controller 61. The print controller 61 outputs display information Cd used to display alert information based on the remaining amount determination information XL in the display section 4. By this, alert information indicating whether the remaining amounts of consumables are in the near-end state or the end state is displayed in the display section 4.

Thereafter, operation information Cs indicating whether an operation for the display of the display section 4 has been performed using the operation section 8 is input to the print controller 61. Thereafter, the print controller 61 determines whether an operation for the display of the display section 4 has been performed based on the input operation information Cs. In other words, the print controller 61 determines whether the user has checked the alert information based on the operation information Cs (step S130). Here, the operation for the display of the display section 4 includes an operation for completion of checking of content displayed in the display section 4. For example, the operation for the display of the display section 4 performed using the operation section 8 includes the following operation. That is, when alert information "a remaining amount of ink is small" is displayed in the display section 4, the user operates the operation section 8 so as to select or press a "check" button or the like which is displayed in addition to the alert information.

When the print controller 61 determines that the user has checked the alert information based on the operation information Cs (Y in step S130), the print controller 61 generates control information XO indicating that the user has checked the alert information and outputs the control information XO to the determination threshold value update section 63.

Subsequently, the determination threshold value update section 63 stores the control information XO indicating that the user has checked the alert information and the remaining amount information XC at the time of the check (step S140).

After the determination threshold value update section 63 stores the control information XO and the remaining amount information XC or when the print controller 61 determines that the user has not checked the alert information based on the operation information Cs (N in S130), the print controller 61 determines whether an operation for the alert information has been performed (step S150). Here, the operation for the alert information includes an operation of restoring states of the consumables by replacement or refill of the consumables. For example, the operation for the alert information includes an operation for performing replacement of the ink cartridges 40 or refill of the ink in the ink cartridges 40 after the alert information "a remaining amount of ink is small" is displayed in the display section 4.

When the print controller 61 determines that the operation for the alert information has been performed (Y in step S150), the determination threshold value update section 63 stores the control information XO indicating that the operation for the alert information has been performed and the remaining amount information XC at the time of the operation (step S160). On the other hand, when the print controller 61 determines that the operation for the alert information has not been performed (N in step S150), the print controller 61 determines whether the user has checked the alert information based on the operation information Cs (step S130).

The determination threshold value update section 63 performs machine learning based on the control information XO indicating that the user has checked the alert information, the remaining amount information XC at the time of the check, the control information XO indicating that the operation for the alert information has been performed, and the remaining amount information XC at the time of operation which are stored in the determination threshold value update section 63, and updates the determination threshold value of the remaining amount determination section 62 based on a result of the learning (step S170). By this, a timing when the alert information is displayed in the display section 4 is changed. Here, a result of the machine learning based on the control information XO indicating that the alert information has been checked, the remaining amount information XC at the time of check, the control information XO indicating that an operation for the alert information has been performed, and the remaining amount information XC at the time of the operation is an example of the learning model.

As described above, the ink jet printer 1 of this embodiment causes the determination threshold value update section 63 to perform the machine learning to obtain the determination threshold value of the remaining amount information XC and appropriately update the determination threshold value based on a result of the learning. By this, the remaining amount determination section 62 may determine the near-end state or the end state of the consumables at a timing appropriate for the user. Accordingly, the print controller 61 may display the alert information in the display section 4 at a timing appropriate for the user.

4. Example of Operation of Consumables Determination Controller

As described above, the ink jet printer 1 of this embodiment performs the machine learning to obtain a timing of a notification of the alert information or the determination threshold value of the remaining amount information XC for a notification of the alert information at a timing when an operation for the notification is performed using the operation section 8 after the notification of the alert information. The machine learning of the consumables determination controller 66 will now be described in detail with reference to FIGS. 10 and 11.

In a case where an operation for the notification is not performed after the notification of the alert information, for example, the determination threshold value update section 63 may perform the machine learning such that a timing of the notification of the alert information is delayed or the determination threshold value of the remaining amount information XC for the notification of the alert information becomes small.

Specifically, in FIG. 11, in a case where the alert information is displayed in the display section 4 (step S120) and the print controller 61 determines that the user has not checked the alert information (N in S130), the determination threshold value update section 63 does not store the control information XO indicating that the user has checked the alert information and the remaining amount information XC at the time of check. Thereafter, in a case where the determination threshold value update section 63 performs the machine learning in a state in which the determination threshold value update section 63 does not store the control information XO indicating that the alert information has been checked and the remaining amount information XC at the time of the check, the determination threshold value update section 63 determines that print quality of the ink jet printer 1 based on the remaining amounts of consumables corresponding to the current remaining amount information XC satisfies print quality desired by the user as a result of the machine learning. Accordingly, the determination threshold value update section 63 determines that the determination threshold value for determining whether the alert information is to be displayed which is appropriate for the user is smaller than the current remaining amount information XC as a result of the machine learning. Specifically, the determination threshold value update section 63 performs the machine learning such that the timing of the notification of the alert information is delayed. By this, the alert information may be displayed at a timing more appropriate for the user.

Furthermore, in the case where an operation for the notification is not performed after the notification of the alert information, the determination threshold value update section 63 may perform the machine learning so as to determine whether a notification of the alert information is to be performed.

Specifically, in a case where the determination threshold value update section 63 does not store the control information XO indicating that the user has checked the alert information and the remaining amount information XC at the time of the check, the determination threshold value update section 63 may determine that print quality of the ink jet printer 1 based on the remaining amounts of consumables corresponding to the current remaining amount information XC satisfies print quality desired by the user as described above as a result of the learning and determine that the user does not request display of the alert information as a result of the learning. In other words, the determination threshold value update section 63 may determine that the alert information is not requested by the user as a result of the learning. Accordingly, the possibility that the alert information not requested by the user is displayed in the display section 4 may be reduced.

In the case where an operation for the notification is performed after the notification of the alert information, the determination threshold value update section 63 may perform the machine learning such that the notification of the alert information is displayed earlier or the determination threshold value of the remaining amount information XC for the notification of the alert information becomes larger.

Specifically, in FIG. 11, in the case where the alert information is displayed in the display section 4 (step S120) and the print controller 61 determines that the user has checked the alert information (Y in step S130), the determination threshold value update section 63 stores the control information XO indicating that the user has checked the alert information and the remaining amount information XC at the time of check. Thereafter, in the case where the machine learning is performed in the state in which the determination threshold value update section 63 stores the control information XO indicating that the alert information has been checked and the remaining amount information XC at the time of the check, it is determined that print quality desired by the user may not be satisfied at the timing when the alert information is displayed in the display section 4 as a result of the machine learning. Accordingly, the determination threshold value update section 63 determines that the determination threshold value for displaying the alert information indicating that the remaining amounts of consumables are in the near-end state or the end state which is appropriate for the user is larger than the current remaining amount information XC as a result of the machine learning. Specifically, the determination threshold value update section 63 performs the machine learning such that the alert information is displayed earlier. By this, the display section 4 may display the alert information for the remaining amounts of consumables at a timing more appropriate for the user.

Here, in a case where an operation for the alert information is not performed after an operation for the notification is performed, the print controller 61 may perform a notification of the alert information again in the display section 4. In this case, even if the operation for the alert information is performed after the operation for the re-notification is performed, the determination threshold value update section 63 does not preferably perform the machine learning such that the notification of the alert information is performed earlier or the determination threshold value of the remaining amount information XC for the notification of the alert information becomes large.

Specifically, in FIG. 11, in the case where the alert information is displayed in the display section 4 (step S120) and the print controller 61 determines that the user has checked the alert information (Y in step S130), the determination threshold value update section 63 stores the control information XO indicating that the user has checked the alert information and the remaining amount information XC at the time of check. However, in a case where the operation for the alert information including a restoration process, such as replacement or refill, is not performed on the consumables (N in step S150), it is determined that the print quality of the ink jet printer 1 based on the remaining amounts of consumables corresponding to the current remaining amount information XC satisfies print quality desired by the user, and therefore, the user has not performed an operation for the alert information as a result of the learning. Accordingly, the determination threshold value update section 63 determines that the determination threshold value for determining whether the alert information is to be displayed which is appropriate for the user is not larger than the current determination threshold value as a result of the machine learning. Specifically, the determination threshold value update section 63 does not perform the machine learning such that the notification of the alert information is performed earlier. By this, the display section 4 may display the alert information at a more appropriate timing desired by the user.

Furthermore, the determination threshold value update section 63 may perform the machine learning by combining a plurality of operations including the operation performed on the display of the display section 4 described above and the operation for the alert information.

Specifically, the determination threshold value update section 63 may determine a degree of a determination threshold value for a determination as to whether the alert information is to be displayed in accordance with history in which the control information XO indicating that the user has checked the alert information and the remaining amount information XC at the time of the check are stored and history in which the control information XO indicating that the operation for the alert information has been performed and the remaining amount information XC at the time of the operation are stored, or may determine a degree of delay of the timing of the notification of the alert information or a degree of expediting of the timing of the notification of the alert information as a result of the machine learning. By this, the display section 4 may display the alert information at a timing more appropriate for the user.

Furthermore, the remaining amount information XC of consumables may be signals indicating remaining amounts of a plurality of consumables. A timing of alert display more appropriate for the user may be determined in accordance with the remaining amounts of consumables including the ink, the recording sheet P, and the other consumables which relay on one another. Since the remaining amount information XC of the consumables includes the signals indicating the remaining amounts of these consumables and the determination threshold value update section 63 performs the machine learning based on the remaining amount information XC including the signals indicating the remaining amounts of consumables, the alert information may be displayed at a timing more appropriate for the user.

5. Operation Effect

As described above, in the ink jet printer 1 as an example of an electronic apparatus according to this embodiment, the determination threshold value update section 63 performs the machine learning based on a learning model obtained by associating the remaining amount information XC indicating the remaining amounts of consumables detected by the consumables remaining amount detection circuit 64 with the determination information for determining the replacement state or the refill state of the consumables detected by the remaining amount determination section 62 and updates the determination threshold value for a determination of the replacement state or the refill state of the consumables based on a result of the machine learning, so that alert information based on the remaining amount information of consumables may be displayed at a timing more appropriate for a use environment of the user.

6. Modifications

Although the ink jet printer 1 is illustrated as an example of an electronic apparatus in this embodiment, various electronic apparatuses including a laser printer having toner cartridges as consumables, various mobile electronic apparatuses including a cellular phone, a smartphone, and a digital still camera which includes a battery as consumables, and various electronic apparatuses for household use, commercial use, and industrial use may be used as long as the electronic apparatuses include consumables. Any electronic apparatus may attain the same operation effect as this embodiment.

Although the embodiment and the modifications are described above, the present disclosure is not limited to these embodiment and the modifications and various changes may be made without departing from the scope of the present disclosure. For example, the embodiment and the modifications may be appropriately combined.

The present disclosure includes configurations which are substantially the same as the configuration described in the foregoing embodiment (for example, configurations having the same functions, the same methods, and the same results or configurations having the same purposes, the same effects). Furthermore, the present disclosure includes configurations obtained by changing portions which are not essential of the foregoing embodiment. Furthermore, the present disclosure includes configurations which attain the same operation effects or the same purposes as the configurations described in the foregoing embodiment. Furthermore, the present disclosure includes configurations obtained by adding the general techniques to the configurations described in the foregoing embodiment.

What is claimed is:

1. An electronic apparatus comprising:
   inks or sheets configured to be restored by replacement or refill;
   a display configured to make a notification of alert information based on remaining amount information of the inks or sheets;
   a remaining amount information obtaining circuit configured to obtain the remaining amount information of the inks or sheets; and
   a processor including
      a learning section configured to perform machine learning based on a learning model obtained by associating the remaining amount information with determination information for determining a state of replacement or refill of the inks or sheets, the learning section being configured to perform the machine learning of a determination threshold value of the remaining amount information based on the learning model, and update the determination threshold value based on a result of the machine learning, and
      a determination information obtaining section configured to determine the remaining amount information relative to the determination threshold value that has been updated to obtain the determination information for determining the state of replacement or refill of the inks or sheets, such that the alert information is performed based on the determination information that has been obtained.

2. The electronic apparatus according to claim 1, wherein the learning section performs the machine learning of a timing of the notification of the alert information when an operation for the notification is performed after the notification of the alert information is performed.

3. The electronic apparatus according to claim 1, wherein the learning section performs the machine learning such that a timing of the notification of the alert information is delayed when an operation for the notification is not performed after the notification of the alert information is performed.

4. The electronic apparatus according to claim 1, wherein the learning section determines whether the notification of the alert information is to be performed as the machine learning when an operation for the notification is not performed after the notification of the alert information is performed.

5. The electronic apparatus according to claim 1, wherein the learning section performs the machine learning such that the notification of the alert information is performed earlier when an operation for the notification is performed after the notification of the alert information is performed.

6. The electronic apparatus according to claim 5, wherein
the display performs a re-notification of the alert information when an operation for the alert information is not performed after an operation for the notification is performed, and
the learning section does not perform the machine learning such that the notification of the alert information is performed earlier even when an operation for the alert information is performed after an operation for the re-notification is performed.

7. The electronic apparatus according to claim 1, wherein the learning section performs the machine learning of the determination threshold value of the remaining amount information when an operation for the notification is performed after the notification of the alert information is performed.

8. The electronic apparatus according to claim 7, wherein the learning section performs the machine learning such that the determination threshold value becomes large when an operation for the notification is not performed after the notification of the alert information is performed.

9. The electronic apparatus according to claim 7, wherein the learning section performs the machine learning such that the determination threshold value becomes small when an operation for the notification is performed after the notification of the alert information is performed.

10. The electronic apparatus according to claim 9, wherein
the display performs a re-notification of the alert information when an operation for the alert information is not performed after an operation for the notification is performed, and
the learning section does not perform the machine learning such that the determination threshold value becomes large even when an operation for the alert information is performed after an operation for the re-notification is performed.

* * * * *